(12) United States Patent
Nguyen et al.

(10) Patent No.: US 8,798,522 B2
(45) Date of Patent: Aug. 5, 2014

(54) SIMULATION AUTHORING TOOL

(75) Inventors: Truc Nguyen, Wichita, KS (US); David Williams, Wichita, KS (US)

(73) Assignee: NexLearn, LLC, Wichita, KS (US)

( * ) Notice: Subject to any disclaimer, the term of this patent is extended or adjusted under 35 U.S.C. 154(b) by 1233 days.

(21) Appl. No.: 12/110,735

(22) Filed: Apr. 28, 2008

(65) Prior Publication Data

US 2009/0269730 A1 Oct. 29, 2009

(51) Int. Cl.
| G09B 7/00 | (2006.01) |
| G09B 7/02 | (2006.01) |
| G09B 7/04 | (2006.01) |
| G09B 5/00 | (2006.01) |
| G09B 5/14 | (2006.01) |
| G09B 5/06 | (2006.01) |
| A63F 13/10 | (2006.01) |

(52) U.S. Cl.
CPC .. *G09B 7/00* (2013.01); *G09B 7/02* (2013.01); *G09B 7/04* (2013.01); *G09B 5/00* (2013.01); *A63F 2300/807* (2013.01); *G09B 5/14* (2013.01); *G09B 5/06* (2013.01); *G09B 5/065* (2013.01); *A63F 2300/632* (2013.01); *A63F 13/10* (2013.01); *A63F 2300/5533* (2013.01)
USPC ........................................................ 434/362

(58) Field of Classification Search
CPC .............. G09B 7/02; G09B 7/00; G09B 7/04; G09B 5/00; G09B 5/065; G09B 5/14; G09B 5/06; A63F 2300/807; A63F 2300/632; A63F 13/10; A63F 2300/5553
USPC ........................... 434/362, 322, 323, 350, 365
See application file for complete search history.

(56) References Cited

U.S. PATENT DOCUMENTS

| 6,606,480 | B1* | 8/2003 | L'Allier et al. | 434/362 |
|---|---|---|---|---|
| 6,736,642 | B2* | 5/2004 | Bajer et al. | 434/236 |
| 2002/0098468 | A1* | 7/2002 | Barrett et al. | 434/322 |
| 2003/0009352 | A1* | 1/2003 | Bolotinikov et al. | 705/1 |
| 2003/0031996 | A1* | 2/2003 | Robinson | 434/350 |
| 2004/0014020 | A1* | 1/2004 | Fujino et al. | 434/350 |
| 2004/0015344 | A1* | 1/2004 | Shimomura et al. | 704/200 |
| 2004/0018477 | A1* | 1/2004 | Olsen | 434/307 R |
| 2004/0166484 | A1* | 8/2004 | Budke et al. | 434/433 |
| 2005/0033617 | A1* | 2/2005 | Prather et al. | 705/7 |
| 2005/0095569 | A1* | 5/2005 | Franklin | 434/350 |

(Continued)

OTHER PUBLICATIONS

"The Sims 2: FAQ/Walkthrough by Warfreak", http://www.gamefaqs.com/pc/914811-the-sims-2/faqs, Feb. 24, 2008, pp. 1-319.*

*Primary Examiner* — Jack Yip
(74) *Attorney, Agent, or Firm* — Hovey Williams LLP

(57) ABSTRACT

A computer program for creating a social simulation comprises code segments for enabling a user to create a plurality of social simulation stages, to create a map associating each of the plurality of stages with at least one other of the plurality of stages, and to assign a first score value to a first response and a second score value to a second response, wherein the first response and the second response are received from a student during at least one of the plurality of social simulation stages. The computer program further enables the user to assign a condition to a conditional stage of the plurality of simulation stages such that the student experiences the conditional stage only if a cumulative score corresponds to a target score, wherein the cumulative score includes the first score value and the second score value.

25 Claims, 2 Drawing Sheets

(56) References Cited

U.S. PATENT DOCUMENTS

| | | | |
|---|---|---|---|
| 2005/0123892 A1* | 6/2005 | Cornelius et al. | 434/323 |
| 2005/0221265 A1* | 10/2005 | Tashiro et al. | 434/322 |
| 2007/0015121 A1* | 1/2007 | Johnson et al. | 434/156 |
| 2007/0082324 A1* | 4/2007 | Johnson et al. | 434/156 |
| 2007/0136672 A1* | 6/2007 | Cooper | 715/751 |
| 2007/0206017 A1* | 9/2007 | Johnson et al. | 345/473 |
| 2008/0038705 A1* | 2/2008 | Kerns et al. | 434/309 |
| 2008/0166691 A1* | 7/2008 | Cowley et al. | 434/322 |
| 2009/0162827 A1* | 6/2009 | Benson et al. | 434/350 |

* cited by examiner

SIMULATION AUTHORING TOOL

BACKGROUND OF THE INVENTION

1. Field of the Invention

The present invention relates to electronically creating social simulations. More particularly, the present invention involves a method and computer program for enabling a user to create a computer-based social simulation by defining various parameters of the simulation, testing the simulation, and publishing the simulation.

2. Related Art

Social simulations are useful tools employed by businesses and educational institutions to help individuals learn to react appropriately to different situations and evaluate the individuals. By creating artificial scenarios that mimic real world situations that the tested individual may face, the simulation allows the individual to react in a pressure-free environment. Thus, if the scenario mimics a pressured situation, the individual will feel more comfortable and will already have a base from which to make decisions when an actual pressure situation occurs. Other scenarios may include executive meetings, employee-employee and employee-manager interactions, teacher-pupil interactions, and training, both for job-related activities and sensitivity training, for example situations involving sexual harassment. Social simulations may be completely text-based or may include various media elements including audio, video, and animation. Social simulation computer programs can also be used to create simple tests.

The creation of social simulation computer programs is a lengthy and involved process that includes various steps, including authoring, designing, testing and publishing. Authoring is the process of creating the background for the simulation. This includes developing the story or situation to be resolved, determining what character types are to be involved, and what the possible reactions to the presented situation are as well as the consequences for each reaction. Designing involves arranging the information from the authoring process within the program, and choosing how the simulation as presented on the computer will look. Testing involves running the simulation and finding any errors or problems that need to be resolved. Publishing involves exporting the data for the simulation. This can be used to create media elements for use in the simulation; i.e. by providing scripts for actors to read from while producing video or audio elements for the simulation.

Unfortunately, existing social simulation computer programs do not enable all these steps. Thus, there is a need for a computer program that enables all of the steps of authoring, designing, testing and publishing the social simulation.

SUMMARY

The present invention provides an improved method of creating a social simulation. Particularly, the present invention provides a computer program for authoring, designing, testing and publishing a social simulation.

In various embodiments of the invention, the program enables a user to create a plurality of social simulation stages, to create a map associating each of the plurality of stages with at least one other of the plurality of stages, and to assign a first score value to a first response and a second score value to a second response, wherein the first response and the second response are received from a student during at least one of the plurality of social simulation stages. The computer program further enables the user to assign a condition to a conditional stage of the plurality of simulation stages such that the student experiences the conditional stage only if a cumulative score corresponds to a target score. The cumulative score includes the first score value and the second score value, such as where the cumulative score includes the sum of the first score value and the second score value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

A preferred embodiment of the present invention is described in detail below with reference to the attached drawing figures, wherein.

DETAILED DESCRIPTION

Figure 1:
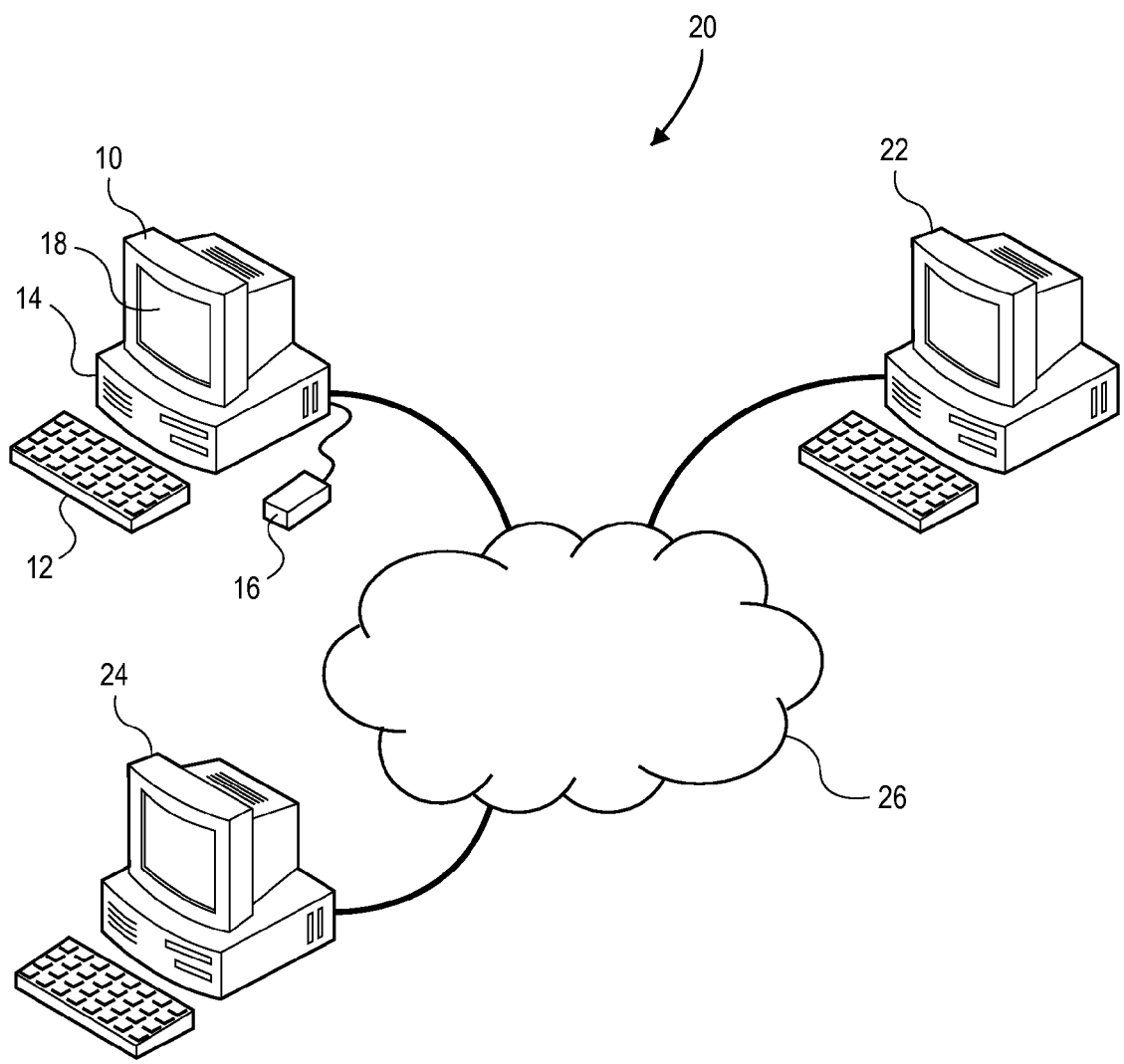
FIG. 1 is an exemplary computer network for implementing a computer program of the present invention.

The present invention involves a method and computer program for authoring, designing, testing, and publishing social simulations with the purpose of teaching or entertaining a student. The method of the present invention is especially well-suited for implementation on a computer network, such as the computer 10 illustrated in FIG. 1 that includes a keyboard 12, a processor console 14, a scanner 16, and a display 18. The computer 10 may be a part of a computer network, such as the computer network 20 also illustrated in FIG. 1 that includes one or more client computers 10, 22 and one or more server computers 24 interconnected via a communications system 26.

An embodiment of the present invention will thus be generally described herein as a computer program. It will be appreciated, however, that the principles of the present teachings are useful independently of a particular implementation, and that one or more of the steps described herein are merely examples of a program and equipment that may be used to implement the present invention and may be replaced with other software and computer equipment without departing from the scope of the present invention.

The computer program of the present invention is stored in or on a computer-readable medium residing on or accessible by a host computer for instructing the host computer to implement the method of the present invention as described herein. The computer program preferably comprises an ordered listing of executable instructions for implementing logical functions in the host computer and other computing devices coupled with the host computer. The computer program can be embodied in any computer-readable medium for use by or in connection with an instruction-execution system, apparatus, or device, such as a computer-based system, processor-containing system, or other system that can fetch the instructions from the instruction-execution system, apparatus, or device and execute the instructions.

The order listing of executable instructions comprising the computer program of the present invention will hereinafter be referred to simply as "the program" or "the computer program." It will be understood by those skilled in the art that the program may comprise a single list of executable instructions or two or more separate lists, may be included in a single software application or multiple software applications, and may be stored on a single computer-readable medium or multiple distinct media. For example, an embodiment of the invention will herein be described as comprising multiple software applications that operate substantially independently of one another and that may be installed on separate, geographically-remote computers.

As used herein, a "computer-readable medium" can be any means that can contain, store, communicate, propagate, or transport the program for use by or in connection with the instruction execution system, apparatus, or device. The computer-readable medium can be, for example, but is not limited to, an electronic, magnetic, optical, electromagnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CD-ROM). The computer-readable medium could even be paper or other suitable medium upon which the program is printed, as the program can be electronically captured via, for instance, optical scanning of the paper or other medium, then compiled, interpreted, or otherwise processed in a suitable manner, if necessary, and then stored in a computer memory.

Figure 2:
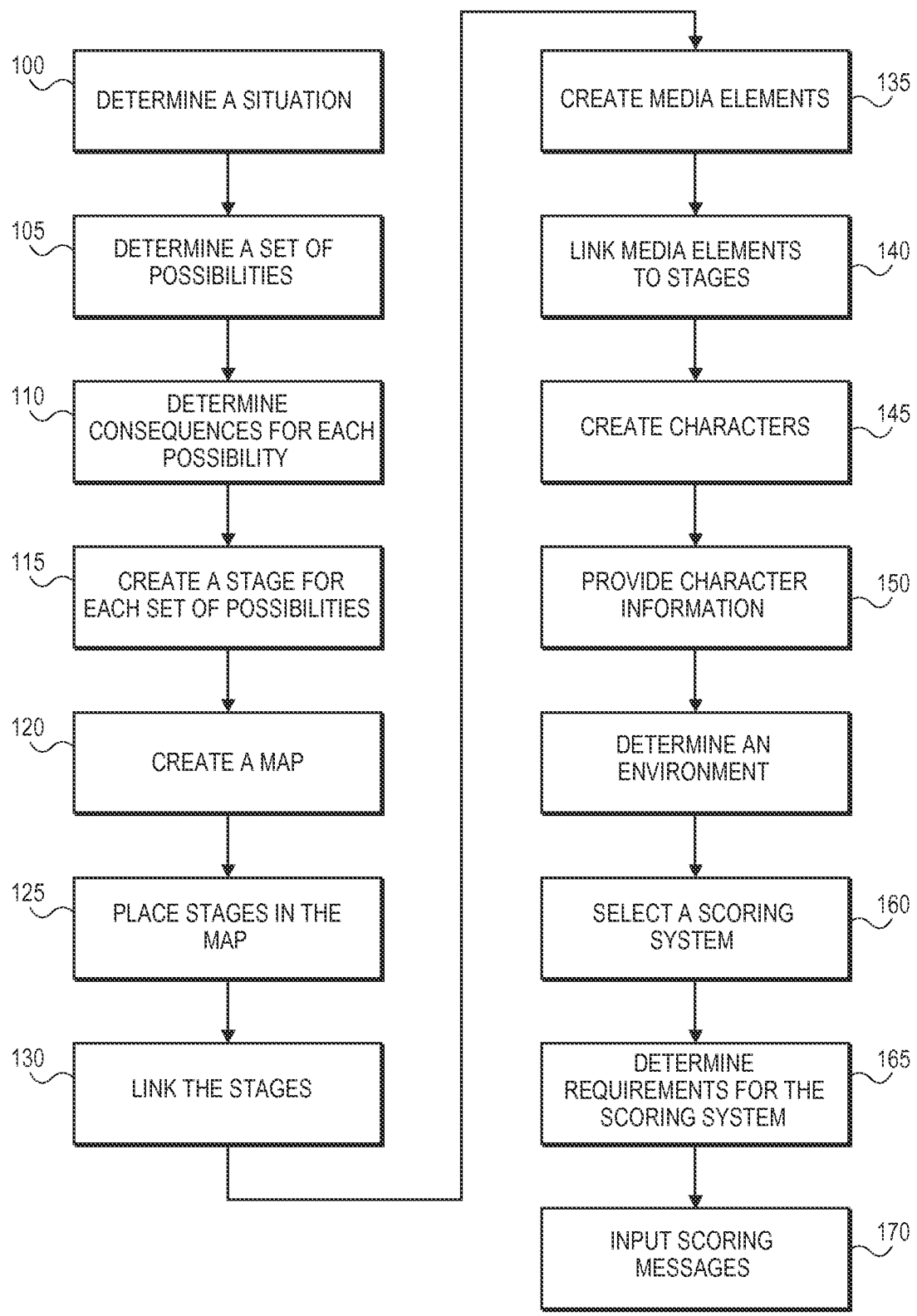
FIG. 2 is a flowchart of steps involved in a method for creating social simulations.

A flowchart of steps implemented by an exemplary embodiment of the present invention is illustrated in FIG. 2. Some of the blocks of the flowchart may represent a software object, module segment, portion of code, or standalone application of the computer program of the present invention which comprises one or more executable instructions for implementing the specified logical function or functions. In some alternative embodiments, the functions noted in the various blocks may occur out of the order depicted in FIG. 2. For example, two blocks shown in succession in FIG. 2 may in fact be executed substantially concurrently, or the blocks may sometimes be executed in the reverse order depending upon the functionality involved.

A social simulation is an interactive environment in which different social situations are presented so that a student can experience them in a controlled setting. The simulation can be of any social interaction, such as, for example, interactions between employees and customers or clients, between different employees, between employees and managers, between executives, and between teachers and pupils. During the course of the simulation the student is presented with different options or "possibilities" for each scenario the student faces. Each possibility has a consequence which determines what the next step of the simulation will be. When the student makes a choice, the next step of the simulation is called up. Each possibility and consequence should be carefully created so that each reflects the reality of the situation being simulated. Each of the situations may be presented to the student in the simulation in a variety of ways, including video, audio, text, and animation.

As used herein, a "student" is a person for whom the simulation is intended. The student can be a specific individual or a known or unknown group of individuals, who are intended to be subjected to the simulation in order to be taught, evaluated, tested, examined, and so forth. By way of example, the student may be an individual attending school or an employee of a company. As used herein, a "user" is an individual who creates social simulations using the present invention.

The present invention enables the user to quickly and easily create social simulations by enabling the user to create a computer-based social simulation by defining various parameters of the simulation, testing the simulation, and publishing the simulation. Referring to FIG. 2, the user first determines a situation for the simulation, as depicted in block 100. Determining the situation involves choosing a subject or subjects. The subject may relate to, for example, a problem to be solved, a dilemma to be resolved, assessments of company policy, in-depth explanations of internal processes, model conversations with executives or clients, or any of a number of situations or problems which may face a pupil, employee, or other individual the simulation may be designed for.

Next, a short list of objectives or "learning points" may be generated that reflects the main points of the simulation and is used to define categories for scoring, as explained below. This list may then expanded into a basic outline of the best-case scenario for the simulation. This best-case scenario helps define how the simulation should begin and end, and to identify critical teaching points in between. Ideally, these simulations will closely mirror real-life situations and reactions.

Each simulation comprises a situation, an interaction, and an evaluation. The situation may include at least one scenario, at least one character, and at least one evaluation. Scenarios include a description of the situation and may be represented textually, graphically, or via video. Characters are textual, graphical or video representations of real or animated humans, animals or objects designed to interact with the student. Learning points are general or specific, task-based objectives that must be accomplished through interaction with the character or characters within the simulation. The present invention enables the user to create characters, and provide characteristics to the characters, including a name, an image, a position and a personality, as depicted in FIG. 2 by blocks 145 and 150.

Interaction includes character responses, student choices or "possibilities", and directed feedback. Character responses include textual, graphical, audio, video, or other suitable responses provided by the character. Student choices are textual, graphical, or other suitable student-input options that may be displayed on-screen within a simulation. Each possibility has a consequence, which results in another set of possibilities or ends the simulation. The present invention enables the user to determine a set of possibilities for each scenario and to determine the consequences, as depicted in blocks 105 and 110 of FIG. 2. Directed feedback is textual, graphical or other suitable reinforcement of student choices. Each of these components of interaction may include text boxes, audio files, video files, graphical images, graphical buttons, textual hyperlinks, and performance reports.

Evaluation may be accomplished using a variable mechanism or other appropriate means to score student choices. The evaluation may be displayed immediately following a particular choice within the scenario or simulation, upon the completion of a part of the scenario or simulation, and/or at the conclusion of the simulation. The evaluation may be presented in a textual, graphical, audio, video or other suitable format.

The present invention enables the user to author, design, test and publish social simulations. Referring to the blocks depicted in FIG. 2, the user authors the simulation in several steps. First, the user creates stages for the simulation, as depicted in block 115. Then the user creates a map of divergent data threads containing at least one media element, places the stages within the map, and links the stages together, as depicted in blocks 120, 125 and 130, such that the stages present a logical progression through the simulation. The media elements can include text boxes, character responses, student choices, directed feedback, audio files, video files, graphical buttons, textual hyperlinks, and performance reports. The present invention enables the user to creatively write text representations of the media elements, link the media elements to provide a logical map of sequencing through the simulation, as depicted in block 140, and manage the media element representations of the stages.

The present invention enables the user to design the simulation. Referring to FIG. 2, the user first creates media elements, as depicted in block 135. Then, the user manipulates data properties for each media element within the stage. The user manipulates the data properties in order to provide a coherent and effective presentation of the media elements of the simulation to a student that is to be taught by the simulation. Stages may be designed individually or as templates that can populate other stages within the simulation.

Testing allows the user to run the simulation and find errors or potential points of improvement.

Publishing is accomplished through the compilation and resolution of all media data contained on every stage of the simulation. This involves a multi-step process, preferably comprising five steps. The preferred first step is verification of the integrity of the social simulation map. The preferred second step is exporting all data files in appropriate formats, for example XML, for playback. The preferred third step is the preparation of all media files utilized in the presentation of the simulation. The preferred fourth step is the creation of one or more simulation player files. The final preferred step is launching the simulation player file in the appropriate playback format which may include formats such as an executable file or Flash media.

The present invention provides an interface with which the various components and steps already described can be created and implemented. The interface provides tabs and toolbars to facilitate the authoring, designing, testing and publishing of a social simulation. In a preferred embodiment, the tabs may include but are not limited to a map tab, a write tab, a design tab, a reviewing tab, a library tab, and a properties tab.

Each simulation has at least one topic. Each topic consists of at least one stage. The stage is the building block of the simulation. Each stage represents one screen of a finished simulation, and can contain one or more media elements and one or more sets of possibilities or responses. The Map Tab contains all of the topics and stages within the simulation. The user may add, edit, link, or delete topics and stages within the Map Tab in the interface. In a preferred embodiment this is accomplished through the use of a main tab and a topics tab. The main tab serves as the means for adding, linking, and deleting topics contained within the simulation. The topics tab allows the user to add, link, and delete stages within the simulation. Any stage within the displayed topics can be accessed within this tab.

The map tab may include the following options, Copy, Paste, Link, Unlink, Add New Stage, New Topic Stage, Delete Stage, Entry Stage, Stage Transition, Map Control, Performance, Review Result, Properties. The Write and Design Tabs may include the following Options: Cut, Copy, Paste, Layout Order, Change Linked Stage, Open Linked Stage, Stage Transition, Properties.

The write tab serves as an editable interface for all text-based elements of the situation. For example, character responses, menu choices, text boxes, and video clip scripts.

The user utilizes the design tab to view a layout of the simulation. Using the Design Tab the user can view the environment, character image, speak box, menu choice box, and feedback bar for each stage of the simulation.

By utilizing the reviewing tab the user is able to review the simulation and make changes or comments for any stage in the simulation. For instance, the user may edit the stage from the reviewing tab, or the user may add comments. The purpose of the comments is to tag stages or media elements as Error Spots, Question Spots, or Interesting Spots. The Error Spot comment tag allows the user to identify actual errors within the stages or media elements. The Question Spot comment tag allows the user to identify issues that need clarification within the stages or media elements. The Interesting Spots comment tag allows the user to mark stage or media elements that contain unique characteristics or may require additional graphic or engineering work.

The library tab displays all of the design templates available in the simulation that can be applied to stages.

The user may utilize the properties tab to display the characteristics of the selected stage and the media elements within that stage. Using the Properties tab, the user can modify image file names, text color, pixel coordinates and element attributes.

In a preferred embodiment, some of the options from the map, write and design tabs may optionally be accessed by using the right mouse button anywhere within the interface of the present invention, and selecting the action that is desired. The actions that may be available using the right-click method include: cut, copy, paste, link, unlink, add new stage, new topic stage, delete stage, entry stage, stage transition, map control, performance, review result, properties, cut, copy, paste, layout order, change linked stage, open linked stage, and stage transition, The interface provides the user with several toolbars with which the user may author, design, test, or publish simulations. In a preferred embodiment, the available toolbars may include a menu toolbar, a standard toolbar, a formatting toolbar, a media toolbar and a map toolbar. Each toolbar offers a bundled set of buttons and drop-down menus, which allow the user to modify various aspects of the simulation.

The Menu toolbar may comprise at least eight drop-down menus, including drop-down menus labeled: File, Edit, Insert, Simulation, Build, Tools, Window, and Help. The file drop-down menu includes at least the following actions: New, which starts creation of a new simulation; Open, which opens an existing simulation; Close, which closes the current simulation; Save, which saves the current simulation and any changes made to it; Save As, which allows the user to save the current simulation under a different name than it was previously saved as; Send, which allows the user to send the simulation in an electronic format, for example by e-mail; Recent Projects, which lists the previous four open simulation files; and Exit, which closes the program.

The Edit drop-down menu includes the following actions: Undo, which reverses the last action taken by the user; Cut, which deletes any selected material, such that it can be moved to another location; Copy, which makes a copy of selected material so that it can be placed in another location while remaining in its original location; Paste, which allows selected items that were cut or copied to be put into the location selected.

The Insert drop-down menu includes the following actions: New Linked Stage, which creates a new stage linked into the current simulation; and New Unlinked Stage, which creates a new stage that is not linked to the simulation.

The Simulation drop-down menu includes the following actions: Settings, which opens a settings dialog box; Profiles, which opens a simulation profiles dialog box; and Learning Points, which opens the learning points dialog box.

The Build menu includes the following actions: Test Sim on Screen, which starts the simulation on the screen so the user can test its functionality, and identify errors or possible enhancements; Test Sim in browser opens an internet browser to run the simulation in so the user can test its functionality, and identify errors or possible enhancements; Test Sim in Flash, which opens the simulation as a standalone Flash file so the user can test its functionality, and identify errors or possible enhancements; build settings, which allows the user to select the format and size of a stage; and build simulations, which finalizes the simulation.

The Tools drop-down menu includes the following actions: spelling; which opens a spell checking utility to check the spelling within a simulation; export scripts, which exports text scripts created for the simulation to an external file to be review or used in creating media elements; scoring, which allows the user to determine how the student should be scored for a simulation; report, in which the user can set how the simulation reports scoring to the student; and learning points, which the user uses to indicate what should be learned by the student for each stage and simulation.

The Window drop-down menu allows the user to see the currently opened items for the simulation. The Help drop-down menu includes the following actions: a help menu, which provides the user with a menu of topics for use of the present invention; and About SimWriter, which provides information about the present invention.

The standard toolbar may comprise at least thirteen buttons, each of which allows the user to perform an action. Each action is also found in the above-mentioned menu toolbar drop-down menus and performs the same action as those found in the menu toolbar. The actions may include: New, Open, Save, Cut, Copy, Paste, Linked Stage, Unlinked Stage, Spell Check, Export Scripts, Export for Review, Build Settings, and Help.

The formatting standard toolbar may comprise at least two drop-down menus and eight buttons. The drop-down menus may comprise at least a font type selection menu and a font size selection menu. The buttons may include: Bold, Italics, Underline, Font Color, Align Left, Align Center, Align Right, and Bulleted List The media toolbar may comprise at least 10 buttons including: Character, Choices, Feedback, Text Box, Image, Video, Button, Link, Report, and Sound.

The map toolbar may comprise at least seven shortcut buttons including: a Character 1 response, a Character 2 response, and a Character 3 response, each of which indicates how a character will respond to a student choice; a new stage with 2, 3, 4, or 5 choices, wherein each choice is a choice offered to the student to make for that stage.

By selecting an option from a drop-down menu or a button on a toolbar, the present invention will open a dialog box related to the selection. Within each dialog box are buttons, drop-down menus, and editable textboxes which may be utilized by the user to, for example, set or change settings for the simulation, provide information for use within the simulation, and attach comments to different aspects of the simulation to make clear what is intended for future users.

The user has two ways to set up a simulation: a SimWizard or simulation settings dialog box. The purpose of the SimWizard is to help the user to quickly create a complete simulation template. Upon starting a new simulation the SimWizard prompts the user with questions to set up the simulation. These questions provide important information about the simulation, that can be used for various purposes which include but are not limited to: reviewing the simulation at a later date for effectiveness; or providing a ready reference for guidance in developing the simulation. The computer stores the answers to the questions, which should give at least the following: the name of the simulation, the location in which the simulation should be saved on the computer hard drive, what should happen in the simulation, what the simulation should accomplish, what environment the simulation is to be set in, what size the simulation should have on the computer screen, how many characters are needed for the simulation and the names, titles and positions of the characters, the design theme for interface elements, what type of simulation, length of time desired for completion of the simulation, and what scoring system to use.

The simulation dialog settings box enables the user to modify the settings made in the SimWizard or create the settings if the SimWizard is not used. The simulation settings dialog box comprises at least four tabs, including an information tab, an editor tab, a scoring tab, and a report tab. The information tab allows information regarding a short name, abbreviation, acronym, or nickname to be entered, which is associated with the simulation and allows the user to quickly and more easily locate the simulation file. The information also allows for a long name to be entered, which represent the name of the simulation file and project folder, and preferably will be more descriptive of the simulation, such that it is easier for someone other than the user to find. Additionally, the author of the simulation and the author's department can be entered, allowing someone other than the user to locate the person responsible for the simulation to ask question, provide input, or communicate in any other way about the simulation.

The editor tab allows information about size of simulation in pixels, may choose from standard computer sizes, measured in pixels such as; 640×480, 800×600 or 1024×768, or enter any other desired size.

Under the scoring tab, the present invention enables the user to select a scoring method. Referring to FIG. 2 the process for selecting the scoring method is depicted by block 160. In a preferred embodiment the selection is accomplished by opening the drop-down menu and highlighting the scoring method desired. Scoring methods include: Correct, Incorrect; Excellent, Good, Mediocre, Bad, Worst; A, B, C, D, F; and/or a point value system. A plurality of scoring values may be assigned to each response within a set of responses. For example, a first value may be assigned as an overall score value, a second value may be assigned to a first learning objective, a third value may be assigned to a second learning objective, and so forth. During execution of the social simulation, the program enables the host computer to track and use each of the score values, as explained below.

In addition to choosing the type of scoring, the results display can be customized by assigning colors to the button, the linking line linking a choice to another stage, the feedback text, and the feedback images. This may be done to make the information stand out, differentiate it, and make it more interesting.

The report tab requires customized information for each new simulation. The present invention enables the user to select or enter a passing score or scores and a failing score for the simulation, as depicted in block 165 of FIG. 2. Additionally, the user may enter messages to be displayed indicating the student's score, as depicted in block 170 of FIG. 2. In a preferred embodiment the messages may indicate whether the student passed or failed the simulation, or received one of a set of scores. For the set of scores (i.e. A, B, C, D, F) the user sets the minimum score needed to achieve each score. The user can also customize the appearance of a bar, which displays the score or the score message, by selecting a bar color and bar width.

The simulation profiles dialog box allows the user to customize three primary introductory elements of a simulation. For example, the user may input a summary of the question, conflict or learning opportunity that the simulation will cover in the situation tab. Under the characters tab, the user can add a new character, including the character's name, position and personality, modify a character by selecting a previously created character and editing the information previously entered, and delete an existing character. Each of these actions is done by utilizing buttons available within the dialog box under the character tab. The objectives tab provides an editable space for the user to type in the objectives for the simulation.

The learning points dialog box allows the user to add, delete and replace the learning points (objectives) for a simulation. These learning points represent what the student should learn during and after the simulation. Learning points may be added to the dialog box by typing them into the learning points window and clicking the button labeled "Add New." Doing this adds the learning point to a simulation's learning points window. Learning points may be deleted by selecting the learning point to be deleted, and selecting the delete button with the computer's mouse or other appropriate selection tool, such as the computer's keyboard. Learning points can be replaced by selecting the learning point to be replaced from the simulation's learning points window, typing the learning point that is to replace it in the learning point window, and selecting the replace button with the mouse or other suitable selection tool.

The user may modify existing simulations using the toolbars and menus previously discussed. As already discussed stages can be added or deleted, and linked or unlinked to the simulation. Media elements can also be added, edited, deleted, linked to a stage, or linked to other elements within a stage. Likewise topics may be linked within a project. Design templates may also be added, edited, deleted, and linked to stages. Finally, each learning point may be linked to different choices that are available to the student.

The present invention also provides users with tools to find technical errors in the simulation map, grammatical and spelling errors in the content of the simulation, and how to generate scripts for audio and video shoots and external reviews. There are three ways to flag areas of interest or concern within the simulation. The flags used include the Error Spots comment tag, Question Spots comment tag and Interesting Spots comment tag, each comment tag was discussed and delineated above.

The present invention also provides a spell check function accessible from the Tools drop-down menu, the menu toolbar, and the standard toolbar. Once selected, the user selects a simulation to check and the spell check will identify misspelled words, prompting the user to ignore the misspelling once or all, or change the spelling of the word. Those words set to ignore all are added to a list of words within the utility, so that the word will be disregarded in the future.

Scripts for characters can be exported to an external file, such as a text file, using the export scripts option for the menu toolbar or the standard toolbar. This allows the user to review the script as well as providing copies of the script which can be used for the purpose of creating media elements to input into the simulation.

In order to complete the simulation, the present invention provides tools for the user to test and build the simulation. The simulation may be tested to ensure its functionality onscreen, in a browser, or other suitable computer environment. These options can be selected selecting build from the menu toolbar. Testing allows a reviewer to go through the simulation as a student would, and identify errors and potential enhancements.

The user can also build settings by selecting build settings from the menu toolbar. Doing this allows the user to select what format to use for the simulation, and the size and scalability of the simulation. The simulation can be completed by selecting build from the menu toolbar.

The present invention also provides a help menu, which enables the user to investigate topics, or search for a particular subject. Additionally, the present invention may provide keyboard shortcuts to various functions found in the toolbars and drop-down menus for ease of use.

In various embodiments of the invention, the program enables the user to conditionally branch the simulation based on the performance of one or more users. Performance may be tracked, for example, by assigning score values to responses provided by students as they select or submit responses or otherwise progress through the social simulation. The user may identify or submit a plurality of learning objectives and assign a plurality of score values to each student response, wherein each score value is associated with one of the learning objectives.

For example, the user may choose to condition the execution of a stage or series of stages on the student's overall score upon reaching a certain point in the simulation; on the student's score for a particular learning objective; on the average score of a plurality of students for a particular learning objective; and/or on a particular student response.

Furthermore, in various embodiments the program enables the user to conditionally branch the simulation on combinations of one or more score values. By way of example, the program enables the user to conditionally branch the simulation based on whether or not a score value is greater than a user-specified value, is less than a user-specified value, is equal to a user-specified value, is not equal to a user-specified value, is greater than or equal to a user-specified value, or is less than or equal to a user-specified value.

The user may define a branch condition in terms of a plurality of score values and/or responses to one or more particular situations. By way of example, the condition may be defined as a first learning objective score being greater than a first user-defined value and a second learning objective score being less than a second user-defined value. This is but one example, and virtually any combination of any number of learning objective scores may be used.

In an exemplary implementation, a user may design a social simulation for training students to interact with clients or customers. Learning objectives of such a simulation may include client satisfaction and evidence-based promotion of products or services, to name just two. To test and score the student's performance in relation to both of these learning objectives, the user may create a stage wherein the student is tasked with presenting a new product to a client. During this stage of the simulation, the student may have the option of choosing a response to a list of responses. As the student selects responses to the client's questions and concerns, points are assigned based on the value of those responses to client satisfaction (e.g., friendly, helpful, etc.) and evidence-based promotion (e.g., effective use of research and other facts).

The user may conditionally branch the simulation according to the student's score in this and other stages. If the user has selected responses that reflect a low client satisfaction score, for example, the simulation may follow a branch designed to further instruct and test the student on client satisfaction. Similarly, if the user has selected responses that reflect a low evidence-based promotion score, the simulation may follow a branch designed to further instruct and test the student on evidence-based promotion.

Although the invention has been described with reference to the preferred embodiments illustrated in the attached drawings, it is noted that equivalents may be employed and substitutions made herein without departing from the scope of the invention as recited in the claims. It will be appreciated, for example, that the method and computer program of the present invention is not limited to use with social simulations, but may also be used to model institutional interaction, or to test general knowledge, and so forth.

Having thus described a preferred embodiment of the invention, what is claimed as new and desired to be protected by Letters Patent includes the following:

The invention claimed is:

1. A non-transitory computer-readable medium encoded with a computer program for creating a social simulation, said computer program comprising:
    a code segment for enabling a user to create a plurality of social simulation stages;
    a code segment for enabling said user to create a first character and a second character and to associate each of the first character and the second character with at least one of the plurality of social simulation stages, each of the characters being a video representation of a real person;
    a code segment for enabling said user to provide characteristics to each of the first character and the second character, the characteristics including an image, a name, a personality, a title and a position of the respective character;
    a code segment for enabling said user to create at least one social interaction between said user and each of the first character and the second character, wherein the first character provides a first character response and the second character provides a second character response that is different than the first character response;
    a code segment for enabling said user to create at least one set of possibilities associated with each social simulation stage, wherein each possibility has a consequence which determines the next step of the simulation, the next step of the simulation being either another set of possibilities or an end of the simulation;
    a code segment for enabling said user to create a map associating each of said plurality of social simulation stages with at least one other of said plurality of social simulation stages;
    a code segment for enabling said user to assign a first score value to a first student response and a second score value to a second student response, wherein said first student response and said second student response are received from a student during at least one of said plurality of social simulation stages;
    a code segment for enabling said user to assign a condition to a conditional stage of said plurality of social simulation stages such that said student experiences said conditional stage only if a cumulative score corresponds to a target score, wherein said cumulative score includes said first score value and said second score value;
    a code segment for enabling said user to provide a message at the end of the simulation indicating whether the student passed or failed the simulation;
    a code segment for enabling said user to review the simulation and flag errors, questions, and spots of interest,
    wherein the simulation is designed for training students to interact with clients.

2. The non-transitory computer readable medium as set forth in claim 1,
    the first score value being an overall score of the first student response and the second score value being an overall score of the second student response,
    said computer program further comprising a code segment for enabling said user to identify a plurality of learning objectives and to assign a third score value to a first learning objective based on the first student response, assign a fourth score value to a second learning objective based on the first student response, assign a fifth score value to the first learning objective based on the second student response, and assign a sixth score value to the second learning objective based on the second student response.

3. The non-transitory computer readable medium as set forth in claim 1, said computer program further comprising a code segment for enabling said user to create at least one media element and to link said at least one media element to at least one of said plurality of social simulation stages.

4. The non-transitory computer readable medium as set forth in claim 1, said computer program further comprising a code segment for enabling said user to create a plurality of responses associated with each of said plurality of social simulation stages, wherein each response represents a choice said user must make in the respective social simulation stage.

5. The non-transitory computer readable medium as set forth in claim 4, said computer program further comprising a code segment for enabling said user to associate one or more of said responses of each social simulation stage with another social simulation stage, such that choosing a response causes said user to experience said other social simulation stage.

6. The non-transitory computer readable medium as set forth in claim 4, said computer program further comprising a code segment for enabling said user to create one or more media elements for presenting each possibility, wherein each of said one or more media elements is chosen from the group comprising an audio element, a video element, and an image element.

7. The computer readable medium as set forth in claim 1, the first character and the second character each being an employee of a company, each interaction involving an in-depth explanation of an internal process of the company or an assessment of company policy.

8. The non-transitory computer readable medium as set forth in claim 1, said computer program further comprising a code segment for enabling said user to select an image for a simulation environment, wherein said simulation environment is associated with at least two social simulation stages of said plurality of social simulation stages.

9. The non-transitory computer readable medium as set forth in claim 1, said computer program further comprising:
    a code segment for enabling said user to determine a size of a viewable portion of said simulation, wherein said size can be a standard size, a custom size, or a variable proportional size; and
    a code segment for enabling user to create a design theme for the simulation, chosen from a set of standard themes, wherein the theme is the visual representation of the simulation.

10. The non-transitory computer readable medium as set forth in claim 1, said computer program further comprising a code segment for enabling said user to create a script for each social simulation stage, wherein said script includes said responses and character reactions to said responses.

11. The non-transitory computer readable medium as set forth in claim 1, said computer program further comprising a code segment for publishing the simulation by exporting all data for the simulation to a user-defined format in a user-defined storage location.

12. The non-transitory computer readable medium as set forth in claim 1, said computer program further comprising a code segment for enabling said user to select a plurality of responses across two or more of said plurality of social simulation stages upon which to base said target score.

13. The non-transitory computer readable medium as set forth in claim 1, said computer program further comprising a code segment for enabling said user to select said condition selected from the group consisting of an overall student score, a student score for a learning objective, a particular response, and an average learning score of a plurality of students.

14. The non-transitory computer readable medium as set forth in claim 1, said computer program further comprising a code segment for enabling said user to base said condition on a plurality of operators, said operators being selected from the group consisting of greater than, less than, equal to, not equal to, greater than or equal to, and less than or equal to.

15. The non-transitory computer readable medium as set forth in claim 1, wherein during the simulation, the student is tasked with presenting a new product to a client.

16. A non-transitory computer-readable medium encoded with a computer program for creating a social simulation, said computer program comprising:
  a code segment for enabling a user to create a plurality of social simulation stages, to identify a plurality of learning objectives, to create at least one set of selectable student responses for each of said plurality of social simulation stages, and to assign a plurality of score values to each response in each set of responses, wherein said plurality of score values includes an overall score and at least one learning objective score;
  a code segment for enabling said user to create a first character and a second character and to associate each of the first character and the second character with at least one of the plurality of social simulation stages, each of the characters being a video representation of a real person;
  a code segment for enabling said user to provide characteristics to each of the first character and the second character, the characteristics including an image, a name, a personality, a title and a position of the respective character;
  a code segment for enabling said user to create at least one social interaction between said user and each of the first character and the second character, wherein the first character provides a first character response and the second character provides a second character response that is different than the first character response;
  a code segment for enabling said user to create a map associating each of said plurality of social simulation stages with at least one other of said plurality of social simulation stages;
  a code segment for enabling said user to assign a condition to a conditional stage of said plurality of social simulation stages such that said student experiences said conditional stage only if an element of said student's score satisfies said condition, wherein said element of said student's score is chosen from the group consisting of an overall student score, a student learning objective score, an average learning objective score for a plurality of students, and a particular response chosen by said student;
  a code segment for enabling said user to provide a message at the end of the simulation indicating whether the student passed or failed the simulation; and
  a code segment for enabling said user to review the simulation and flag errors, questions and spots of interest,
    wherein the simulation is designed for training students to interact with clients.

17. The non-transitory computer readable medium as set forth in claim 16, said computer program further comprising a code segment for enabling said user to create at least one media element and to link said at least one media element to at least one of said plurality of social simulation stages.

18. The non-transitory computer readable medium as set forth in claim 16, said computer program further comprising a code segment for enabling said user to associate one or more of said responses of each social simulation stage with another social simulation stage, such that choosing a response causes said user to experience said other social simulation stage.

19. The non-transitory computer readable medium as set forth in claim 16, the first character and the second character each being an employee of a company, each interaction involving an in-depth explanation of an internal process of the company or an assessment of company policy.

20. The non-transitory computer readable medium as set forth in claim 16, said computer program further comprising a code segment for enabling said user to select an image for a simulation environment, wherein said simulation environment is associated with at least two social simulation stages of said plurality of social simulation stages.

21. The non-transitory computer readable medium as set forth in claim 16, said computer program further comprising:
  a code segment for enabling said user to determine a size of a viewable portion of said simulation, wherein said size can be a standard size, a custom size, or a variable proportional size; and
  a code segment for enabling said user to create a theme for the simulation, chosen from a set of standard themes, wherein the theme is the visual representation of the simulation.

22. The non-transitory computer readable medium as set forth in claim 16, said computer program further comprising:
  a code segment for creating a script of character responses for each social simulation stage, to represent the conflict and the possibilities; and
  a code segment for inputting the script for each social simulation stage into the interface.

23. The non-transitory computer readable medium as set forth in claim 16, said computer program further comprising a code segment for publishing the simulation by exporting all data for the simulation to a user-defined format in a user-defined storage location.

24. The non-transitory computer readable medium as set forth in claim 16, said computer program further comprising a code segment for enabling said user to select said condition selected from the group consisting of an overall student score, a student score for a learning objective, a particular response, and an average learning score of a plurality of students.

25. The non-transitory computer readable medium as set forth in claim 16, said computer program further comprising a code segment for enabling said user to base said condition on a plurality of operators, said operators being selected from the group consisting of greater than, less than, equal to, not equal to, greater than or equal to, and less than or equal to.

* * * * *